Patented June 12, 1934

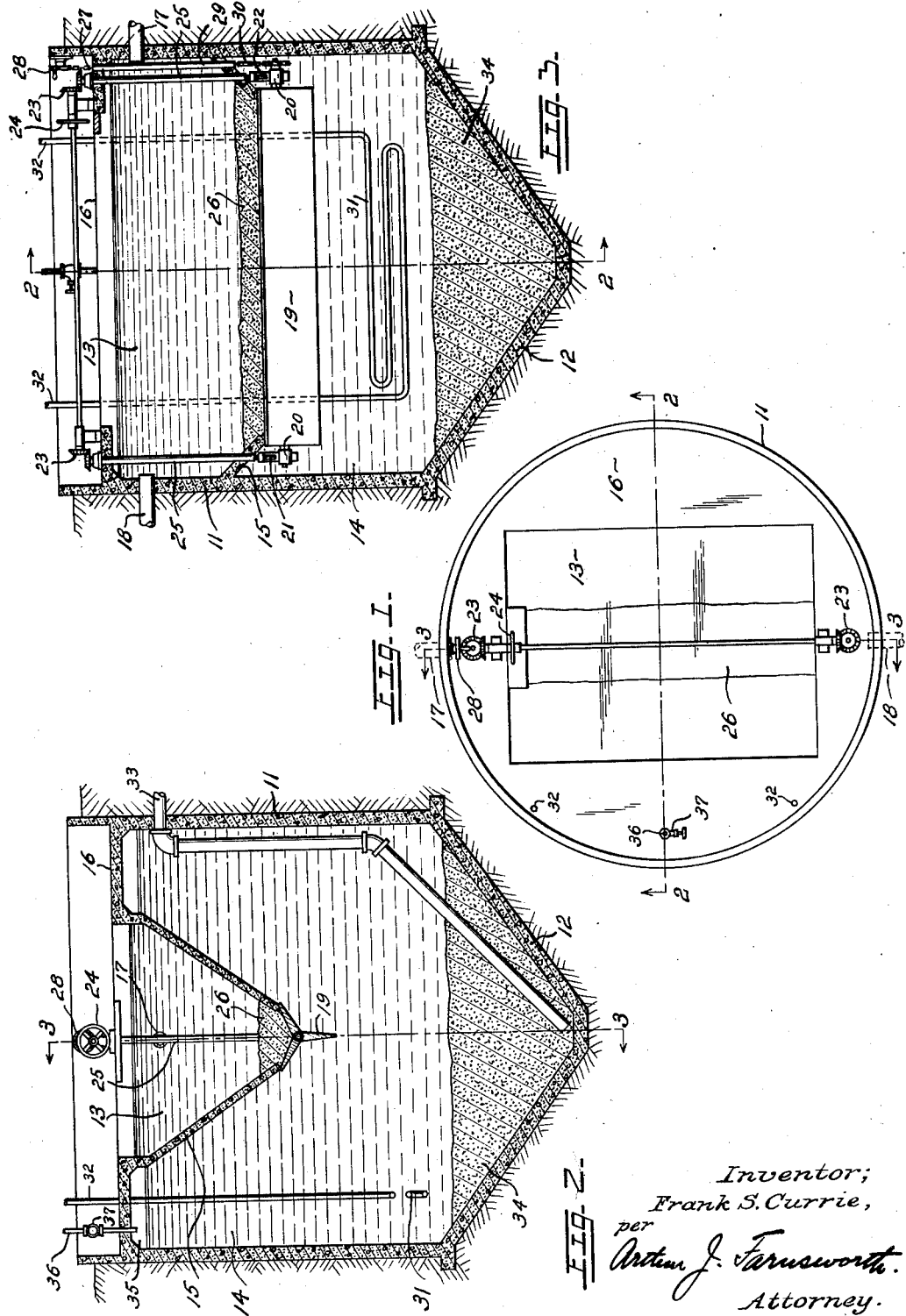

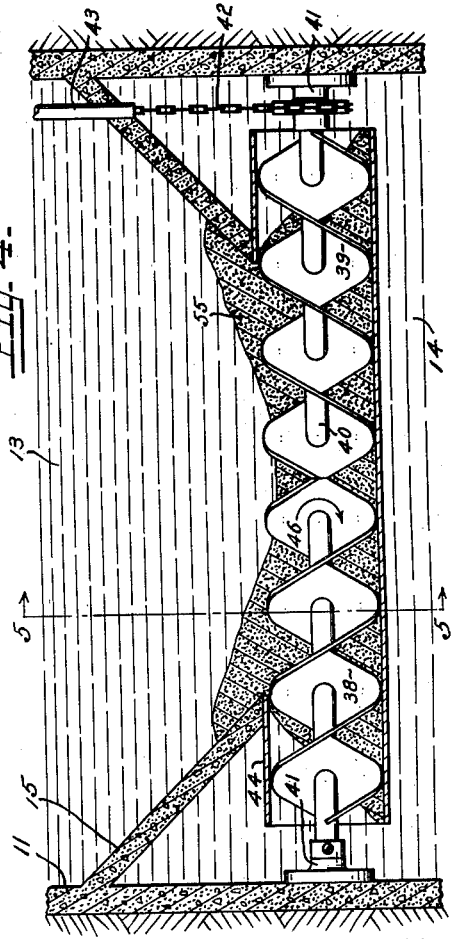
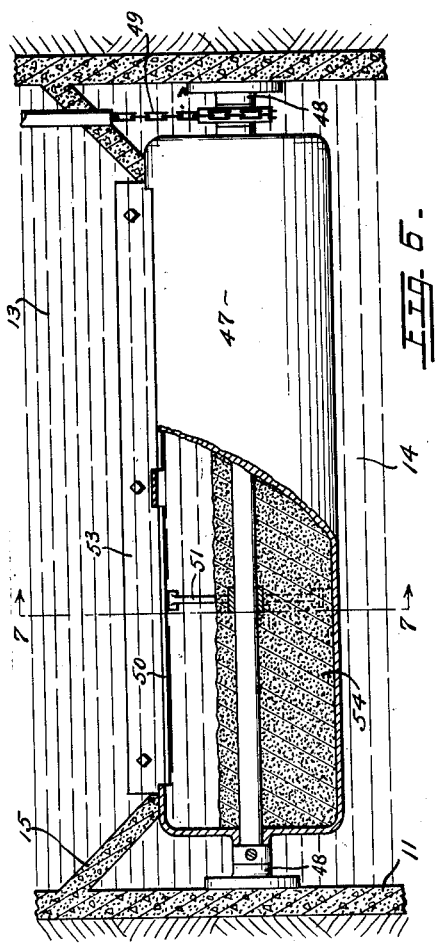
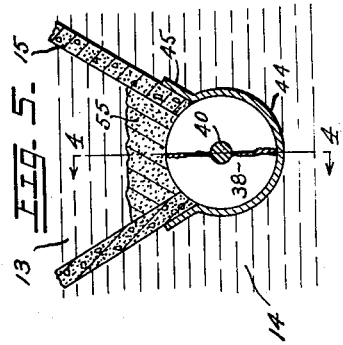
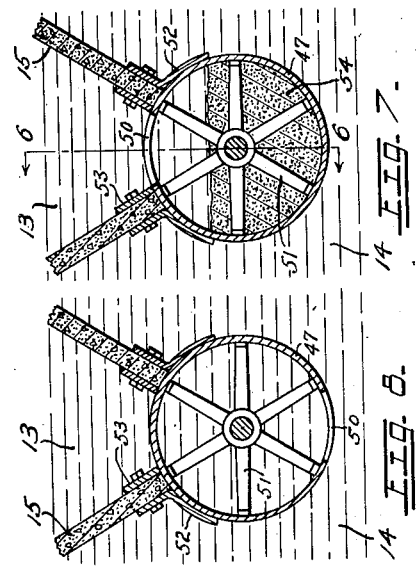
Inventor;
Frank S. Currie,
per
Arthur J. Farnsworth.
Attorney.

1,962,430

UNITED STATES PATENT OFFICE 1,962,430

SEWAGE TREATING APPARATUS

Frank S. Currie, San Bernardino, Calif.

Application November 21, 1932, Serial No. 643,609

14 Claims. (Cl. 210—2)

In this specification, and the accompanying drawings, I shall describe and show preferred forms of my invention; and shall specifically mention certain of its more important objects. I do not limit myself to the forms disclosed, however, since various changes and adaptations may be made therein without departing from the essence of my invention as hereinafter claimed; and objects and advantages, other than those specifically mentioned, are included within its scope.

My invention relates to improvements in apparatus for treating sewage by sedimentation and digestion processes; such, for instance, as by the well known general methods of Imhoff and others. Among its principal objects are; first, to provide apparatus that is adapted for treating sewage sludge in a shorter time than is possible by methods that have been known hitherto; second, to afford facilities for treating sewage in such a manner as to secure a higher degree of purity in the effluent; third, to greatly reduce the necessary cost of installation and operation of sewage disposal works that are capable of operating in the manner indicated; and, fourth, to accomplish the aforesaid and other objects, by means of very simple, dependable and relatively inexpensive construction.

My objects are attained in the manner illustrated in the accompanying drawings, in which—

Figure 1 is a plan view of an improved type of sewage disposal apparatus that embodies the principles of my invention;

Figure 2 is a central section of this new type of construction in elevation, the view being taken on the line 2—2 of Fig. 1;

Figure 3 is a sectional elevation similar to that of Fig. 2, but taken on a plane revolved 90 degrees therefrom, as indicated by the line 3—3 of Fig. 1;

Figure 4 is an elevation in central section of a modified form of my construction, that is adapted to take the place of certain of the elements shown in Figs. 1, 2 and 3; this figure being drawn on a somewhat larger scale than the last mentioned figures;

Figure 5 is a cross-sectional elevation of the construction shown in Fig. 4, the view being taken on the line 5—5 of the last said figure;

Figure 6 illustrates, in central section, a further modification of my invention, which may be substituted for certain of the elements disclosed in Figs. 1, 2 and 3; this figure also being drawn to a somewhat larger scale than that of the last said figures;

Figure 7 is a cross-sectional elevation of the construction shown in Fig. 6, taken on the line 7—7 thereof; and Figure 8 is a view that is identical to that of Fig. 7, except that the rotary element therein has been revolved 180 degrees.

Similar reference numerals refer to similar parts throughout the several views.

My invention will be found to be particularly well adapted to serve for use in connection with, and as a modified form of, the well known Imhoff type of sewage disposal tank; which designation is usually understood to mean a cooperative combination of sedimentation and decomposition chambers, for the treatment of sewage.

In the treatment of sewage sludge by processes of nature, various kinds of decomposition occur. These may be grouped broadly into two classes, namely, putrescent and odorless decomposition. It is desirable, of course, to segregate and confine the putrescent decomposition.

A large portion of the sludge in the digestion chambers of sewage disposal works is always in a more or less constant state of vertical motion during decomposition, by reason of the generation of gas resulting from the digestion processes. The generation of gas in the sludge particles, in the form of minute bubbles, lessens their specific gravity sufficiently to cause them to rise to the top of the liquid in the digestion chamber. At the surface of the liquid, the gas is discharged, and the particles then sink, and remain at the bottom, until new gas bubbles are formed. This cycle of operations is repeated indefinitely, until digestion is complete. Because of the described action, the liquid in the digestion compartment is constantly filled with upwardly and downwardly moving sludge particles. This material is flocculent, and there is a tendency to form floating sludge in the digestion chamber, which, under certain conditions, tends to increase in thickness.

It has been found, and it is now well understood, that the digestion processes can be hastened by maintaining the digestion chambers at a somewhat greater than normal temperature. This has the effect of increasing the capacity of the digestion tanks, by making the activity therein greater.

In the treatment of sewage by the processes mentioned, the first step is to cause it to pass through one or more sedimentation chambers; for the purpose of depositing as much of the solid material therein as is possible. The material accumulated in this manner is then caused to pass into digestion chambers in some way, for completing the treatment. During the digestion of this sludge, the liquor in the digestion chambers is constantly filled with rising and floating undigested sludge particles, for the reasons explained above. Therefore, it is very desirable to prevent commingling of the liquor in the digestion chambers with that of the sedimentation chambers.

Passing to a detailed description of my apparatus, I have illustrated an approved form of sewage treating tank in Figs. 1, 2 and 3. These figures are illustrative of the entire process. They show a large circular vat 11, having an inverted conical bottom 12, positioned mostly underground. This vat is divided into two compartments, viz.; a sedimentation chamber 13, and an underlying digestion chamber 14; by means of sloping walls 15 that are connected to the sides of the vat, or to the upper deck 16 thereof, as the case may be. The basis of the present invention, which permits of greater efficiency in operation, greater purity of effluent, and shorter time for the treatment of sewage, is the inclusion of means for preventing commingling of the liquor in the digestion chamber with that in the sedimentation chamber; while permitting the passage of fresh sludge, that has accumulated in the sedimentation chamber, into the digestion chamber, from time to time.

In the type of construction illustrated, the sedimentation chamber 13 takes the form of a horizontal prism of inverted triangular section, as shown particularly in Fig. 2. At the bottom of this sedimentation chamber, is a relatively narrow rectangular discharge opening or slot, extending nearly the entire length of the chamber, and normally kept closed by means to be described. Sewage enters one end of the sedimentation chamber through an inlet pipe 17, and the effluent therefrom leaves through an outlet pipe 18 at the other end. By reason of the greatly increased cross-section of the flow passage thus provided, the velocity in the sedimentation chamber is very low; and the solids suspended in, or mixed with, the sewage therein, are permitted to settle upon the closure of the slot, at the bottom of the chamber. The effluent, therefore, will be practically clear liquid.

From time to time, at regular intervals as required, the sludge collected upon the closure of the slot at the bottom of the sedimentation chamber is passed into the digestion chamber 14 below, for the purpose of bacterial decomposition. During this passage of sludge from one chamber to the other, means are provided to prevent so far as possible, the liquor of the digestion chamber from becoming commingled with that of the sedimentation chamber; and, further, to secure very little mechanical disturbance of the liquors, to avoid roiling.

In the form of my invention disclosed in Figs. 1, 2 and 3, the closure of the slot of the sedimentation chamber takes the form of a three-vaned rotary valve 19. This is rotatable in movable bearings 20. These bearings may be raised or lowered from deck 16 by means of screws 21 and 22, operated concurrently by bevel-gear drives 23 and a hand-wheel 24. The screws pass upwardly from the digestion chamber, through the sedimentation chamber, in pipes 25. In the arrangement described, one of the screws should be right-handed, and the other left-handed. With this arrangement of apparatus, the hand-wheel 24 may be turned to lower bearings 20 sufficiently to permit the three-vaned valve 19 to be rotated 120 degrees, for dumping the mass of sludge 26 that has accumulated thereon. The rotation may be accomplished by means of a chain 27 and suitable sprockets, operated by a sprocket wheel 28 at the top of the tank, the sprocket chain being led upwardly from the digestion chamber, through the sedimentation chamber, within pipes, of which one is shown at 29 in Fig. 3. The chain is of a length sufficient to permit the necessary lowering of bearings 20, and a sprocket idler 30 may be employed to keep the chain in engagement with its sprockets at all times. This may be done in well known ways (not shown), as by mounting the idler on a swingable arm that is spring-constrained, or weight constrained, to cause the idler to bear against the sprocket chain.

After valve 19 has thus been lowered and rotated 120 degrees, for discharging the sludge accumulated thereon and thereabove, it is raised again so that its vanes will seat upon the margins of the slot in the sedimentation chamber; thereby preventing any commingling of the liquor in the digestion chamber with that of the sedimentation chamber, except possibly for the brief period during which the dumping takes place.

In Figs. 1, 2 and 3, I have shown means for heating the digestion chamber, as by a hot water or steam coil 31 supplied through pipes 32. I have also shown a large suction pipe 33, by which digested sludge 34 may be removed from the bottom of the digestion chamber from time to time.

During the digestion process, gas is discharged from the surface of the liquor in the digestion chamber and space 35 is provided for permitting this. The accumulated gases may be led off from this space, as by means of a pipe 36. The pressure of the gas in space 35 may be maintained constant, or reasonably so, by the use of a gasometer device connected to pipe 36; or by the use of a regulating valve 37, when the gas is to be discharged into the atmosphere.

It will be apparent that various other operating features must be added to those described above, to secure practical operation. Thus, means for discharging the accumulated liquor in digestion chamber 14, either continuously or from time to time, must be employed. Such features do not form any portion of my present invention, are well understood in the art, and are not illustrated in the accompanying drawings for these reasons.

As an alternative means for closing the slot at the bottom of the sedimentation chamber, and for passing fresh sludge to the digestion chamber, a modified form of screw conveyor may be utilized, as illustrated diagrammatically in Figs. 4 and 5. In these figures, the sloping walls of the sedimentation chamber are shown, as before, at 15. Directly beneath the slot in sedimentation chamber 13, is a screw conveyor, in the form of a double-threaded Archimedes screw. The left half 38 of this conveyor is shown as being threaded right-handedly, and the right half 39 as being threaded left-handedly. Both halves are mounted upon a shaft 40 that is rotatable in bearings 41, and that is capable of being rotated, as by a sprocket chain mechanism that is operative from deck 16 of the vat. Thus the sprocket chain 42 may be led upwardly through the sedimentation chamber within a pipe 43, in the manner previously described. The rotating parts, including the screw conveyor, work within an open ended tube 44, the tube being intermediately split and opened up to form attachment wings 45, as shown in Fig. 5, whereby it is mounted upon the lower sloping walls 15 of the sedimentation chamber, directly below the slot therein.

The just described form of device may be operated either continuously or intermittently; but, in either event, it preferably is operated in such a manner that the accumulated sludge 55 in the sedimentation chamber is never wholly removed. In this way the sludge will act as a seal, to prevent commingling of the liquor of the digestion chamber with that of the sedimentation chamber. Thus, referring to Fig. 4, it will be noted that, if the rotary member is revolved in the direction indicated by arrow 46, it will tend to move the sludge from the center of the slot of the sedimentation chamber, toward the respective ends thereof; and to pile it, to some extent, upon sloping walls 15. All the sludge eventually is discharged outwardly from the ends of tube 44; and no commingling of the liquor of the digestion chamber with that of the sedimentation chamber is likely to occur, so long as a sufficient amount of sludge is within tube 44 and upon the bottom of the sedimentation chamber, as illustrated in Fig. 4. However, even though the sludge should be wholly removed from the sedimentation chamber by the screw, there is little likelihood of commingling of the liquors in the two chambers; and sludge particles from the digestion chamber, in order to get into the sedimentation chamber, would have to move a considerable horizontal distance thru tube 44. This hardly is possible.

A second alternative construction, comprising a third species of my invention, is illustrated in Figs. 6, 7 and 8. This consists of a drum-shaped or barrel-type valve, closing the slot at the bottom of the sedimentation chamber, and adapted for periodically removing the sludge therefrom.

This type of valve comprises a sedimentation shell 47 that is rotatable in bearings 48, and that is capable of being rotated by means of a chain 49 and cooperating sprocket mechanism. A longitudinal slot, or slots, 50, of a width equal to that of the slot at the bottom of the sedimentation chamber, extend from nearly one end of shell 47 to the other. In order to preserve a true cylindrical form for the shell, in view of the mechanical weakening thereof caused by the longitudinal slots, one or more internal spiders 51 may be employed if desired.

On the outside of sloping walls 15, and supported thereby, are arcuate metallic flaps 52. On the inside of these sloping walls, longitudinal strips 53 may be placed. These elements serve as packing members, to make a fairly tight joint between the bottom of the sedimentation chamber and the rotatable shell. The circumferential width of flaps 52, walls 15, and strips 53, taken together, is made such as to be somewhat greater than the width of longitudinal slot 50. Therefore, while the accumulated sludge 54 from the sedimentation chamber is being dumped from time to time into the digestion chamber, there will be no direct passage connecting these two chambers, for the interchange of liquors therebetween. Fig. 7 shows how sludge is accumulated within the rotatable shell, and Fig. 8 shows how it may be wholly dumped into the digestion chamber, when the shell has been revolved 180 degrees.

In the ordinary Imhoff tanks, and devices of like nature for the treating of sewage, there generally is a more or less constant interchange of liquor between the two compartments. This results in foul septic liquor in the effluent of the sedimentation tank, and is likely to cause a scum of septic sludge on the surface of the liquor in that tank. These conditions are aggravated when the digestion chamber is heated, since heating results in thermal currents tending to cause an interchange of liquor between the two compartments. In fact, there can be little question that the heating of the digestion compartments of ordinary Imhoff tanks, and those of similar constructions, would be very unsatisfactory, if not practically prohibitive, for the reasons just mentioned. By the use of my invention, in either of the forms shown in Figs. 2, 4 and 6, there can be very little, if any, interchange of liquor between the digestion and sedimentation chambers. The digestion chamber can be heated to any desirable extent, to secure great rapidity of the digestion process. It follows that, for a given size of digestion tank, the capacity may be greatly increased; or, conversely, smaller tanks may thus be employed for the same duty.

It will be obvious to those skilled in the art, that my invention is applicable to many forms of sewage treating devices, and particularly to the usual types of Imhoff tanks wherein the sedimentation and digestion chambers are superimposed. It will further be seen that the gist of the invention resides in providing a closure between the sedimentation and digestion compartments, which prevents liquor from the digestion chamber from being commingled with that of the sedimentation chamber; but which, nevertheless, allows of passing accumulated sludge from the sedimentation chamber to the digestion chamber, either continuously or periodically as may be preferred.

Many specific modifications of my invention are possible, without departing from the spirit thereof. Thus, instead of the species illustrated and described above, I will mention; first, the general type of vaned-valve shown in Figs. 2 and 3 may be provided with any number of vanes desired, and it may be made to work in cooperation with cylindrical surfaces within which it revolves in close contact, rather than requiring lowering before it can be revolved; and, second, in place of the Archimedes screw shown in Figs. 4 and 5, a suitable flight-type of conveyor may be used.

Obviously, the device may be hand-operated or mechanically operated, as desired. If mechanically operated, time switches may be utilized, and the operating mechanism can be made to be interlocking.

Having thus fully described my invention, I claim:

1. Sewage treating apparatus comprising; a sedimentation chamber; a digestion chamber; and rotary valvular means whereby matter may be passed by gravity from the first said chamber into the second said chamber while preventing a reverse flow of matter therebetween.

2. Sewage treating apparatus comprising; a sedimentation chamber; a digestion chamber at a lower level than the sedimentation chamber; and rotary valvular means whereby solid matter may be passed from the first said chamber into the second said chamber by gravity, while preventing a reverse flow of matter therebetween.

3. Sewage treating apparatus comprising; a sedimentation chamber; a digestion chamber at a lower level than the sedimentation chamber; and rotary valvular means whereby solid matter may be passed from the first said chamber into the second said chamber by gravity, while preventing a reverse flow of matter therebetween, and without commingling matter from the digestion chamber with matter within the sedimentation chamber.

4. Sewage treating apparatus comprising; a sedimentation chamber; a digestion chamber; a passage leading from the bottom of the sedimentation chamber into the digestion chamber; and rotary valvular means for closing said passage; said means being adapted for gravitationally passing material from the first said chamber into the second said chamber through said passage.

5. Sewage treating apparatus comprising; a sedimentation chamber; a digestion chamber; a passage leading from the bottom of the sedimentation chamber into the digestion chamber; and rotary valvular means for closing said passage; said means being adapted for gravitationally passing material from the first said chamber into the second said chamber through said passage, while preventing a reverse flow of matter therebetween.

6. Sewage treating apparatus comprising; a sedimentation chamber; a digestion chamber; a passage leading from the bottom of the sedimentation chamber into the digestion chamber; and rotary valvular means for closing said passage; said means being adapted for gravitationally passing material from the first said chamber into the second said chamber through said passage, while preventing a reverse flow of matter therebetween, and without commingling of matter from the digestion chamber with matter within the sedimentation chamber.

7. Construction as set forth in claim 4 wherein the passage closing means consists of a pluralvaned rotary valve.

8. Construction as set forth in claim 4 wherein the passage closing means consists of a rotary valve having vanes adapted to seat upon the margin surrounding said passage.

9. Construction as set forth in claim 4 wherein the passage closing means consists of a rotary cylindrical valve.

10. Construction as set forth in claim 4 wherein the passage closing means consists of a valve in the form of a rotary cylindrical shell; said shell having closed ends and a longitudinal slot therethrough adapted to register with said passage.

11. Construction as set forth in claim 4 wherein the passage closing means consists of a valve in the form of a rotary cylindrical shell having closed ends and a longitudinal slot therethrough adapted to register with said passage; and means for preventing direct communication between said chambers through said slot.

12. Construction as set forth in claim 1 wherein the matter passing means consists of a screw conveyor.

13. Construction as set forth in claim 1 wherein the matter passing means consists of a rotary screw conveyor within an open ended shell; said shell having an intermediate longitudinal slot therethrough communicating with the sedimentation chamber.

14. Construction as set forth in claim 1 wherein the matter passing means consists of a rotary screw conveyor within an open ended shell; said shell having an intermediate longitudinal slot therethrough communicating with the sedimentation chamber; and said conveyor having right-hand and left-hand screw portions, extending from its center toward its respective ends.

FRANK S. CURRIE.